US009205980B2

(12) United States Patent
Walter (10) Patent No.: US 9,205,980 B2
(45) Date of Patent: Dec. 8, 2015

(54) STORAGE RACK WITH AUTOMATIC STORAGE LOCATION ACQUISITION

(75) Inventor: Franz Walter, Oedheim (DE)

(73) Assignee: Hänel & Co., Altstätten (CH)

(*) Notice: Subject to any disclaimer, the term of this patent is extended or adjusted under 35 U.S.C. 154(b) by 973 days.

(21) Appl. No.: 12/937,287

(22) PCT Filed: Apr. 2, 2009

(86) PCT No.: PCT/EP2009/053964
§ 371 (c)(1),
(2), (4) Date: Oct. 22, 2010

(87) PCT Pub. No.: WO2009/124878
PCT Pub. Date: Oct. 15, 2009

(65) Prior Publication Data
US 2011/0035045 A1    Feb. 10, 2011

(30) Foreign Application Priority Data

Apr. 11, 2008 (DE) .......................... 10 2008 018 436

(51) Int. Cl.
*G06F 7/00*     (2006.01)
*B65G 1/137*    (2006.01)

(52) U.S. Cl.
CPC .............. *B65G 1/137* (2013.01); *B65G 1/1373* (2013.01)

(58) Field of Classification Search
USPC ........... 700/213, 214, 217, 219, 222; 382/291
See application file for complete search history.

(56) References Cited

U.S. PATENT DOCUMENTS 6,076,023 A * 6/2000 Sato .............................. 700/214
6,738,687 B2 * 5/2004 Hanel .......................... 700/214
(Continued)

FOREIGN PATENT DOCUMENTS

DE    38 09 520 C1    10/1989
DE    43 18 341 A1    10/1994
(Continued)

OTHER PUBLICATIONS

International Search Report for PCT/EP2009/053964, dated Jun. 15, 2009, 3 pages.

*Primary Examiner* — Kyle Logan
(74) *Attorney, Agent, or Firm* — Thomas B. Ryan; Harter Secrest & Emery LLP (57) ABSTRACT

A storage shelf (10) has a plurality of supports (14) arranged on top of each other for supporting stock carriers (15) which can be moved by means of an automatic transfer and removal device (13), has at least one access opening (18) for supplying and removing the stock carriers (15), and has a computer (20) in which information about the stored goods (17, 17a) is saved. At least one image sensing device (24) is provided which is suitable for the optical detection of goods placed on the stock carriers (15) and can produce digital image information, wherein the digital image information can be stored in the computer (20) and called up by means of a display unit (22, 23). The display unit (22) is associated with a selection device which uses the digital image information to allow selection of a stock carrier (15) and movement thereof to the access opening (18) by means of the computer. The computer (20) has an image data archive (34) for archiving the digital image information of the stock carrier (15), and an image data processing unit (38) which is designed for the detection and/or recognition of modification to the loading state of stock carriers (15) and/or for the detection and/or recognition of free storage places using the digital image information from the image data archive (34).

19 Claims, 6 Drawing Sheets

(56) References Cited

U.S. PATENT DOCUMENTS

| | | | |
|---|---|---|---|
| 7,196,622 B2* | 3/2007 | Lambright et al. | 340/539.26 |
| 7,212,885 B2* | 5/2007 | Diaz et al | 700/242 |
| 2002/0032501 A1* | 3/2002 | Tilles et al. | 700/214 |
| 2002/0041698 A1* | 4/2002 | Ito et al. | 382/103 |
| 2002/0107673 A1* | 8/2002 | Haller et al. | 703/1 |
| 2002/0190845 A1* | 12/2002 | Moore | 340/10.3 |
| 2002/0196145 A1* | 12/2002 | Moore | 340/572.5 |
| 2003/0147738 A1* | 8/2003 | Hanel | 414/807 |
| 2003/0164754 A1* | 9/2003 | Roseen | 340/309.16 |
| 2004/0133483 A1* | 7/2004 | Potter et al. | 705/28 |
| 2005/0006569 A1 | 1/2005 | Yoshiyuki | |
| 2005/0018879 A1* | 1/2005 | Ito et al. | 382/103 |
| 2005/0067420 A1* | 3/2005 | Diaz et al. | 221/2 |
| 2005/0216117 A1* | 9/2005 | Lee et al. | 700/215 |
| 2006/0036643 A1* | 2/2006 | Tsuboi | 707/103 R |
| 2007/0116365 A1* | 5/2007 | Kloer | 382/190 |
| 2007/0142961 A1 | 6/2007 | Bhasin et al. | |
| 2007/0296595 A1* | 12/2007 | Moore | 340/572.7 |

FOREIGN PATENT DOCUMENTS

| | | |
|---|---|---|
| DE | 198 28 659 A1 | 5/1999 |
| DE | 20121417 U1 | 8/2002 |
| DE | 10 2004 028 743 A1 | 3/2005 |
| DE | 29724869 U1 | 3/2005 |
| DE | 10 2006 052 659 A1 | 7/2007 |
| DE | 10 2006 015 68 A1 | 10/2007 |
| GB | 2 419 722 A | 3/2006 |

* cited by examiner

STORAGE RACK WITH AUTOMATIC STORAGE LOCATION ACQUISITION

The invention relates to a storage rack with a plurality of supports arranged on top of each other for supporting carriers which can be moved by means of an automatic loading and removal device. The storage rack has at least one access opening for inserting and removing the carriers, and comprises a computer wherein information about the stored goods is stored. The storage rack is provided with at least one image capture device which is suitable for optical recording of the goods placed on the carriers and is able to produce digital image information wherein the digital image information can be stored in the computer and recalled by means of a display unit. A selection device which uses the digital image information to allow selection of a carrier and movement thereof to the access opening by means of the computer is associated with the display unit. Furthermore, the invention relates to a method for storing or removing storage goods in a storage rack of this type and a computer program product for execution of such a method.

Storage racks of said type are known from prior art under the designation "vertical lift". In such storage racks, for storing or removing storage goods a carrier is moved to the access opening in each case. As soon as the carrier is available in the access opening, the operator may insert storage goods into the carrier or remove them from the carrier.

Modern storage shelves of the type mentioned above are provided with a control system which serves for stockkeeping and wherein information is Modern storage shelves of the type mentioned above are provided with a control system which serves for stockkeeping and wherein information is stored about which storage goods are stored in which carrier. This allows for the respective carrier to be easily found by the operator.

In order to simplify stockkeeping, DE 198 28 659 A1 proposes to provide light barriers registrating removal of items from the containers and notifying a control unit of such removal of items in a storage rack with fixed storage rack floor sheets on which containers for storing goods are placed.

According to DE 43 18 341 A1 a method for storage and removal of cuboid shaped storage goods and a device for performing this method have been disclosed. In this method pharmaceutical products in cuboid shaped packages are separated on a conveyor belt. Recognition of a bar code on the sides of the package will then be attempted by means of detection devices. In a further step, height, width and length of the separate packages are detected. In a control unit, a storage plan for storage drawers is stored. By comparing this storage plan with the detected size of separate packages a free storage space on one of the drawers is selected. The package with the pharmaceutical product is then moved to this location. There is no operator interaction intended with the drawers, as in such a case the occupancy data stored in the control unit would not be updated and selection of free storage space would therefore return faulty results.

DE 201 21 417 U1 discloses a storage rack having most of the characteristics mentioned at the beginning. An image sensing program stored in the computer is capable of generating a raster system which allows detection and display of free storage places in carriers.

The object of the invention is to accelerate the storage operation in a storage rack of the type mentioned above and to simplify stockkeeping and detection of free storage spaces.

In order to achieve this object it is suggested according to claim 1 that the computer will contain an image data storage for archiving the digital image data of the carriers and an image data processing unit designed to detect and/or recognize free storage spaces based on the digital image data in the image data storage.

Advantageous embodiments of the storage rack according to the present invention are subject of subclaims 2 through 8.

In the storage rack according to the present invention the storage space occupied by newly stored storage goods is automatically detected and noted in the data about stored storage goods. Likewise, free storage spaces are detected by the computer based on the digital image data. This has the advantage that free storage spaces are recognized even if the storage goods have slipped in the carriers. Furthermore, a precisely located storage is no longer necessary to allow detection of free storage spaces and the storage rack can be filled with storage goods of any shape.

The storage rack according to the present invention will obviate the need for the operator to enter into the computer at which location in the carrier moved to the access opening the newly stored storage goods have been placed. Likewise, when storage goods are removed there is no need to enter the previous storage location of the storage goods into the computer. Furthermore, the selection of a carrier having a suitably large free storage space is simplified. The storage operation is thus accelerated and reliability of stored data concerning the occupancy situation is increased.

The storage rack may comprise a contactless detection unit for recognition of storage goods. As there is no need for the operator to manually enter an identification of the storage goods any more, this also accelerates storage or removal operation and increases reliability of available data.

The storage goods may comprise a wireless transponder device for identification purposes and the storage rack may be provided with a communication device for wireless transponders designed to transfer identification data to the computer.

Advantageously, the wireless transponder device comprises an RFID tag. Various examples of such labels are known from prior art and they are available in various shapes. Especially, such labels can be found as small adhesive labels having low weight and volume as well as being easy to handle.

The communication device may be provided with an RFID receiver unit. Such an RFID receiver unit provides the possibility to detect all objects marked by means of an RFID tag in the area of the access opening and/or in the area of the carrier in a contactless manner and without the need for optical accessibility, as is necessary for the detection of bar codes.

In order to determine a free storage space the computer may be provided with a size data storage containing data for storage space requirements of certain storage goods. This will increase accuracy of a suggestion for a free storage place to store storage goods.

The display unit can be designed to display a preview of the free storage space that has been determined. This allows orientation for the operator on the carrier even while the carrier is being removed from the storage rack and is being moved to the access opening, thus shortening search for free storage space on the carrier.

For communication between its units the storage rack is provided with a LAN or a CAN bus. This type of communication channels can be operated reliably and with low failure rate in an industrial environment.

Furthermore, a method for storage or removal of storage goods in a storage rack according to the present invention is suggested, wherein at first the storage goods to be stored or removed are identified by an operator or by the contactless detection unit, a free storage space or the storage location is identified by the computer based on stored storage information or stored image data, then the carrier including the free storage place determined is moved to the access opening, the storage goods are stored or removed, and finally the storage information in the computer is reconciled.

The method according to the present invention allows for reliable update of storage information thus minimizing the influence of operator errors.

Advantageous embodiments of the method are subject of claims 10 through 20.

By means of the display unit the storage space determined by the computer on storage can be displayed to and rejected by an operator, in which case another free storage space will subsequently be determined. This allows for verification of the suggested storage space.

The storage space of the storage goods determined by the computer on removal can be displayed to an operator by means of the display unit. Thus, the operator can find the storage space on the carrier more easily.

Advantageously, the image data processing unit will split the digital mage data into a raster the raster elements of which can be marked as free or occupied in the storage information. This will decrease the effort needed for processing image data, thus allowing for inexpensive and energy efficient parts to be used for the computer and the image data processing unit.

To reconcile storage information the image capture device may capture and transfer one image of the carrier before and following storage or removal to the image archive storage respectively. This will provide a record of which changes have been made to the carrier by the operator.

The image data processing unit can generate a difference for each pixel of a raster element between the pixel of the image captured before storage or removal and the pixel of the image captured after storage or removal and total the differences within a raster element to calculate a similarity value. This enables the image data processing unit to detect in which raster elements changes have occurred due to storage or removal.

The image data processing unit is furthermore able to perform a process for detecting free raster elements where a percentage of pixels with color values which are within an identification range is determined and the raster element is marked as unoccupied if the percentage exceeds a defined threshold value. This allows detection of free space, especially on newly inserted carriers, without the need to use archived image data.

In an embodiment of the method the image capture device performs the method to detect free raster elements for each raster element of a carrier.

Advantageously, the computer comprises a data base wherein storage locations and/or storage quantities of storage goods are saved. Thus, once storage goods have been stored they can be recovered easily.

In order to reconcile storage information the computer is able to store the storage location determined using the digital image information and the identification of the stored storage goods in the data base. Thus, it is no longer necessary to re-run the time consuming image data processing for each request for a free storage space or certain storage goods.

The computer is able to generate a list of storage goods contained in the carrier before and after the storage or removal operation and determine the storage goods removed and stored by a comparison of the lists. This further increases reliability of the data base.

To accomplish the object of the invention a computer program product for performing the method according to one of claims 9 through 20 is furthermore suggested which is designed to be executed in the computer and/or the image data processing unit and/or the image data archive storage.

Details and further advantages of the storage rack according to the present invention will be apparent from the following description of a preferred example of an embodiment. The drawings are designed solely for purposes of schematical illustration of the embodiment of the invention, showing.

Figure 1:
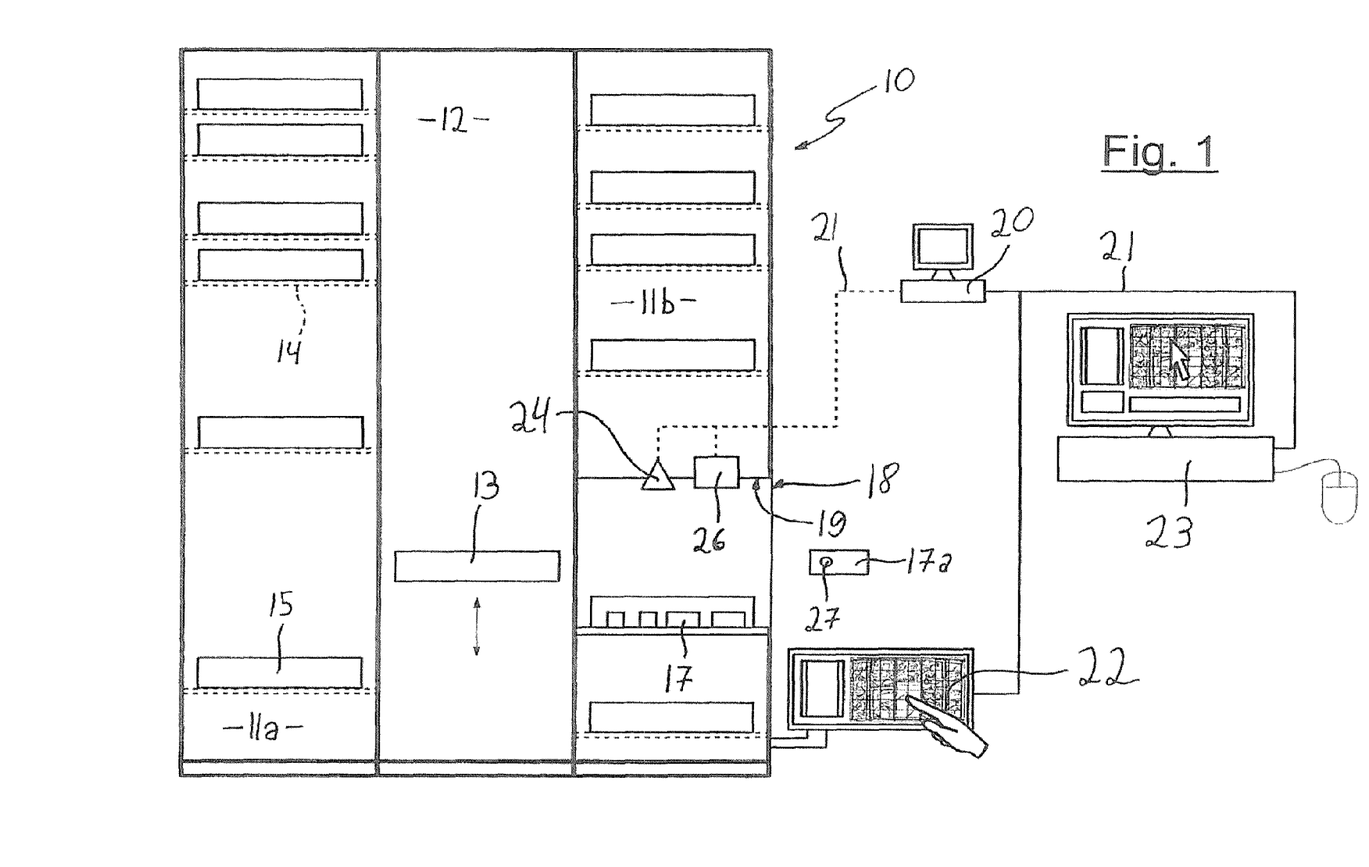
FIG. 1 a storage rack with sensing, display, and processing units.

The storage rack 10 shown in FIG. 1 comprises two modules 11a and 11b which are located spaced apart from each other. The modules 11a, 11b comprise a plurality of carrier supports 14 which are located in pairs spaced apart from each other on opposing side walls. The carrier supports 14 serve to support trough shaped carriers 15 wherein storage goods 17 are contained.

Between modules 11a, 11b a conveyor space 12 is provided wherein a moveable automatic loading and removal device 13 is located by which the carriers can be moved.

Module 11b is provided with an access opening 18 through which the carriers 15 can be loaded or removed. Likewise, it is possible to remove storage goods 17 from a carrier 15 which has been moved to the access opening 18 and/or store them in it.

A computer 20 which inter alia serves to control the storage rack 10 is associated with the storage rack 10. An operator device 22 located at the storage rack 10 and an independently operable visual inspection station 23 are linked to the computer 20 by means of a LAN 21, i.e. a local computer network.

An image capture device 24 consisting of a digital camera is located in a top face 19 of the access opening 18. The digital camera 24 is positioned to allow registration of a carrier 15 which has been moved to the access opening 18 in its entirety.

For transfer of digital image data to the computer 20, the digital camera 24 is linked thereto by means of the LAN 21.

A contactless sensing device consisting of an RFID receiver 26 is also connected to the LAN 21. The storage goods 17 are provided with RFID tags 27, thus allowing the storage goods 17 to be identified by the RFID receiver 26.

Figure 2:
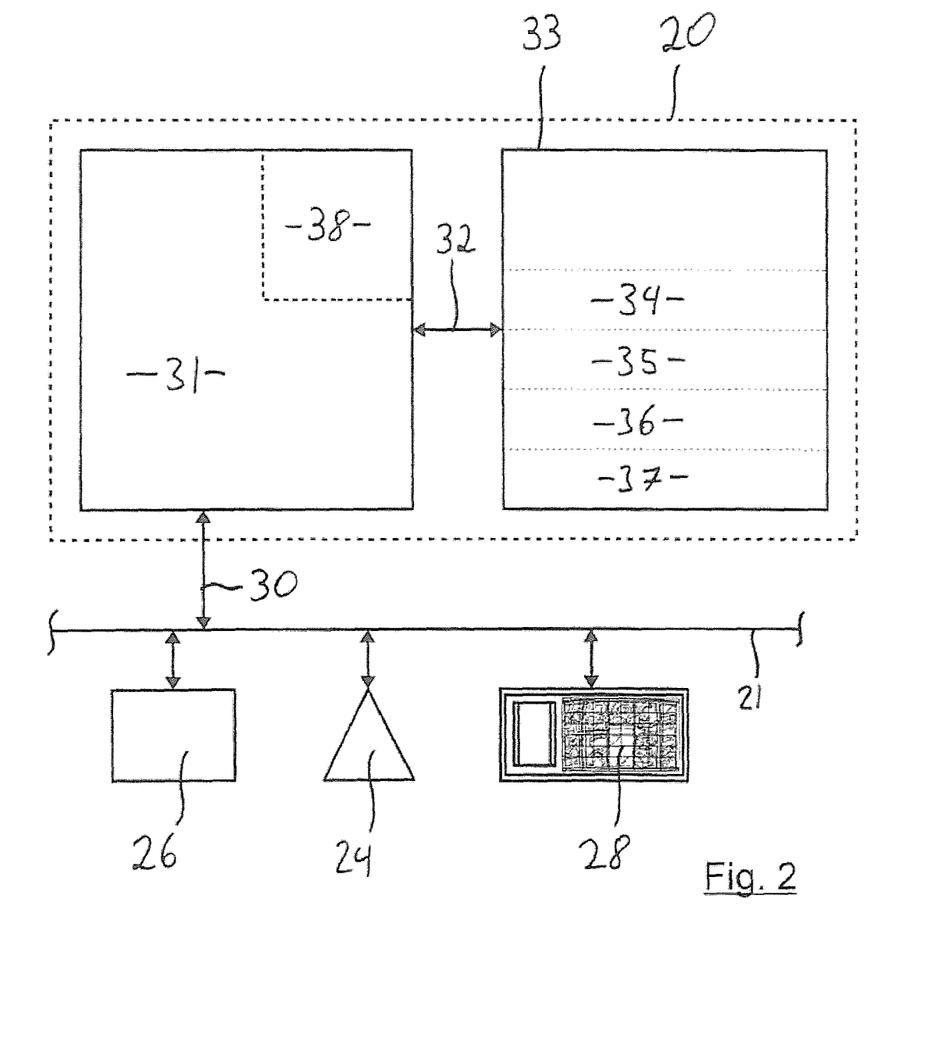
FIG. 2 a block diagram of the computer.

The computer 20 depicted in FIG. 2 is connected to the LAN 21 by means of a communication interface 30. The computer 20 is thus able to exchange data with the RFID receiver 26, the digital camera 24 and a display device 28 over the LAN 21. Furthermore, the automatic loading and removal device 13 can be accessed by means of the LAN 21 (not shown herein).

The operator device 22 is associated with a control unit (not shown) to control the automatic loading and removal device 13 which is responsible for controlling removal and insertion of the carriers 15. The computer 20 can communicate with this control unit and is thus relieved from directly controlling the mechanics of the storage rack 10. This control unit also allows operating the storage rack 10 by means of the operator device 22 without the computer 20.

The computer 20 comprises a central processing unit 31 which is linked to a data memory 33 by means of a storage interface 32. Parts of the data memory 33 serve as image data archive 34, size data memory 35, storage data base 36 and as occupancy information memory 37.

The central processing unit 31 comprises an image data processing unit 38 for processing the image data supplied by the digital camera 24. The image data supplied by the digital camera 24 is stored in the image data archive 34 together with a metadata record. The metadata record, for example, contains information concerning the photographed carrier 15, date and time of the photo, information pertaining to whether the image was acquired before or after access by an operator as well as an identification code for the operator who has induced the carrier 15 to be moved to the access opening 15.

The size data memory 35 contains size and weight information for various storage goods 17. Each type of storage goods 17 is associated with a part number which allows, for example, to retrieve the size of the storage goods 17 from the size data memory 35.

The part number can also be used to retrieve data pertaining to storage spaces of storage goods 17 having a certain part number from the storage data base 36.

The occupancy information memory 37 contains information for each carrier 15 concerning which areas of the carrier 15 are occupied by storage goods 17 and which areas are free.

Figure 3:
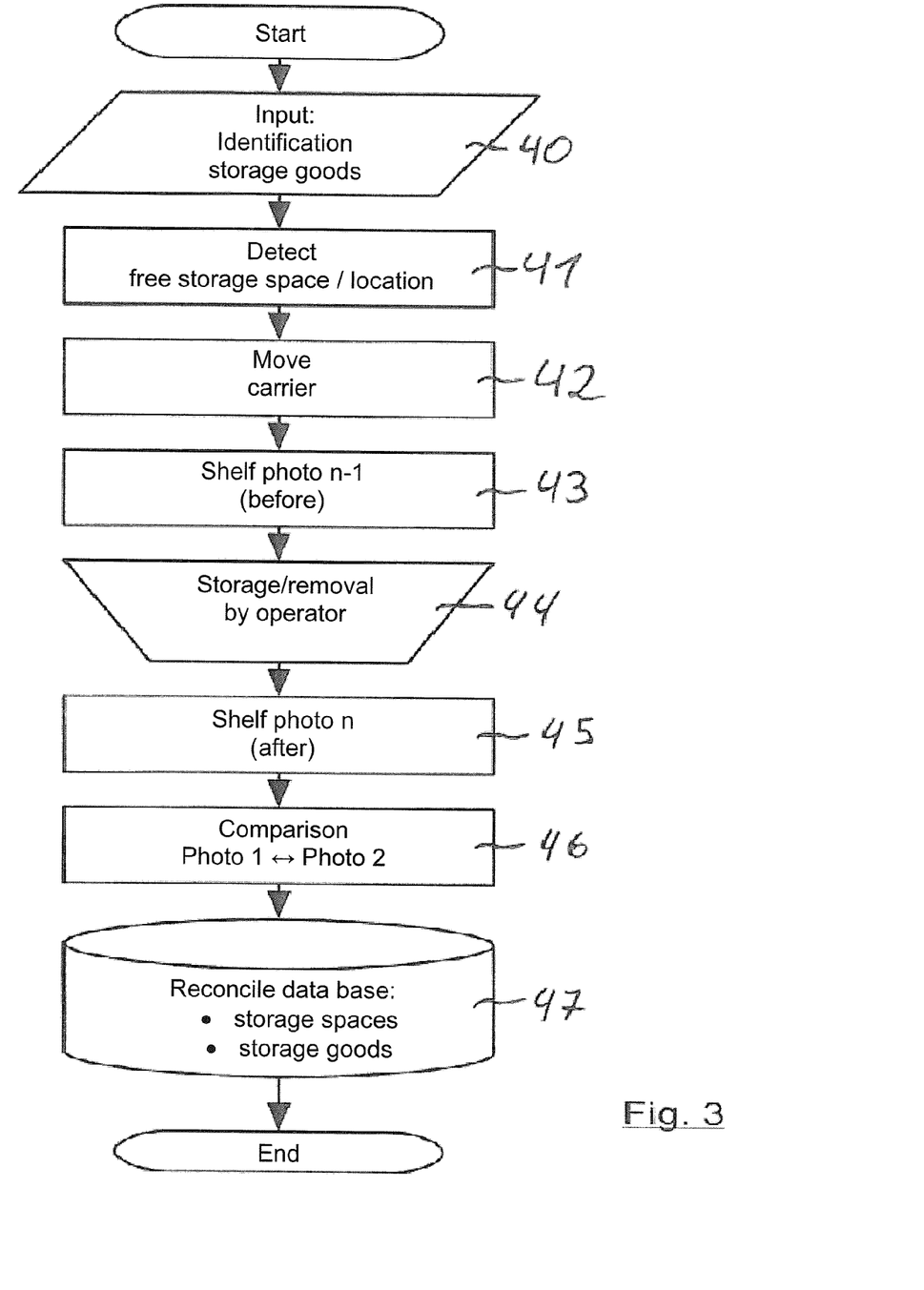
FIG. 3 a flow chart to illustrate a storage or removal operation.

FIG. 3 shows the course of a storage operation in storage rack 10. During a first step 40 an operator identifies storage goods 17a to be newly stored to the computer 20. This will be accomplished by moving the RFID tag 27 attached to the storage goods 17a into the reception are of the RFID receiver 26. In case of storage goods 17a which are too small or unsuitable for attaching an RFID tag 27 identification may, for example, also be accomplished by entering a part number by means of the operator device 22 or the visual inspection station 23.

The operator also wears an RFID tag 27 attached to his/her clothing transmitting the operator identity to the RFID receiver 26.

In a further step 41, the computer 20 uses the identification of the storage goods 17a to retrieve their size from the size data memory 35. The computer 20 will subsequently search the occupancy information memory 37 for a free storage space of sufficient size. Once such storage space has been identified the carrier 15 with the free storage space will be moved to the access opening 18 in a further method step 42.

Once the carrier 15 has reached the access opening 18, the digital camera 24 will take a picture of the carrier 15 in a step 43. The image is transferred to the computer 20 where it will be stored in the image data archive 34 in association with the information that this image shows a state before an operator action.

In step 44 the operator stores the storage goods 17a in a free storage space in the carrier 15. A suggestion for free storage space is displayed on the operator device 22 for this purpose.

Once storage is completed this status will be entered by the operator by means of the operator device 22, inducing a picture of the carrier 15 to be taken and transferred to the computer 20 by the digital camera 24 in a further processing step 45. The computer 20 will store the image in the image data archive 34 in association with the information that it contains a state after an operator action.

In a compare step 46, the computer 20 in association with its image data processing unit 38 compares the pictures taken before and after the operator action and detects occupancy changes in the carrier.

Based on these detected changes, in a further step 47, the storage data base 36 and the occupancy information memory 37 are updated.

Figure 4:
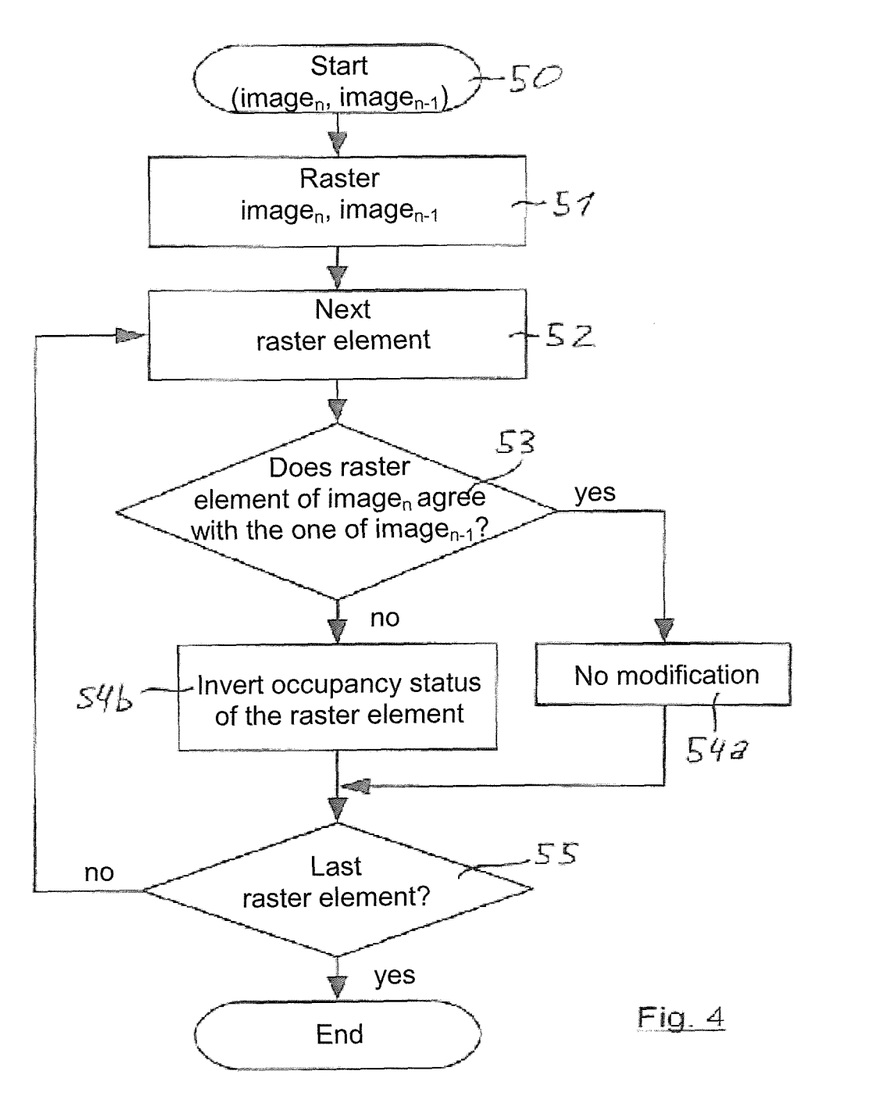
FIG. 4 a flow chart with a process to detect changes in a carrier.

In order to detect the changes in the occupancy situation, the image data processing unit 38 performs a method as shown in FIG. 4. In a first step 50, the image data processing unit 38 retrieves two images from the image data archive 34. The first image 39a shown in FIG. 5a was taken before the storage operation, the second image 39b shown in FIG. 5b was taken after the storage operation.

Figure 5A:
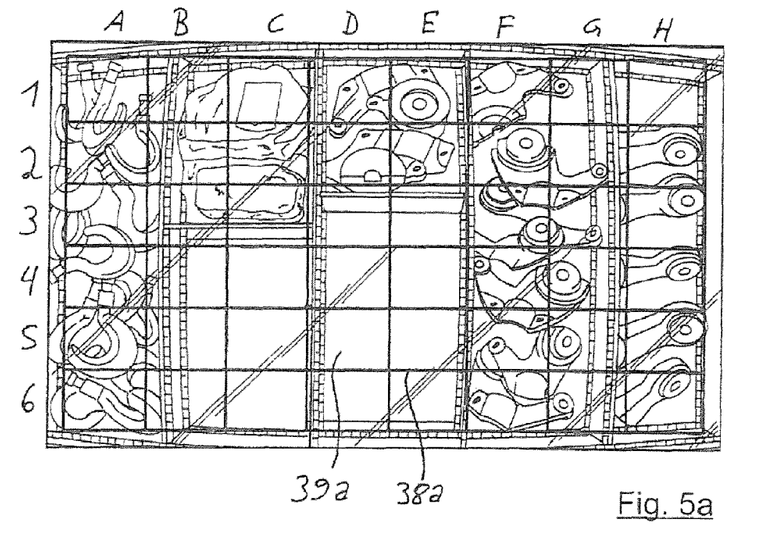
FIG. 5a a photo of a carrier before a storage operation with a raster.
Figure 5B:
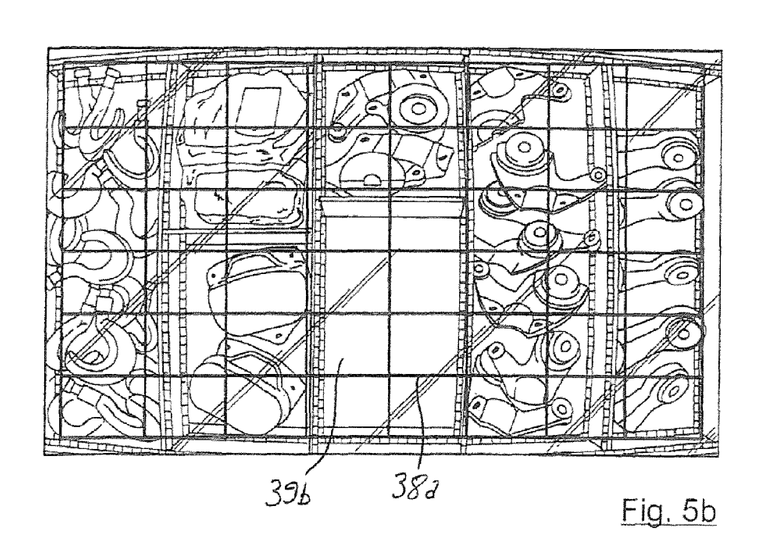
FIG. 5b a photo as in FIG. 5a after a storage operation.

After these images 39a, 39b have been retrieved from the image data archive 34, a raster 38a will be superimposed on them by the image data processing unit 38 in step 51.

In step 52, the image data processing unit 38 selects a raster element to be processed. In step 53, a pixel by pixel comparison is performed between the raster element of picture 39a and the raster element of picture 39b. If the raster elements match with each other, as it is, for example, the case in elements A3 and G1, the occupancy status of the raster element in the occupancy information memory 37 will not be not changed in step 54a.

If, however, a change has occurred between picture 39a and picture 39b in the compared raster element, as it is the case in raster elements C4 through C6, the occupancy status of the raster element in the occupancy information memory 37 will be inverted in step 54b.

In a next step 55 the image data processing unit 38 verifies whether all raster elements have been compared with each other. If this is not true the processing will be continued with a new raster element in step 52.

If, however, the last raster element has been compared, the detection of changes will be completed.

Figure 6:
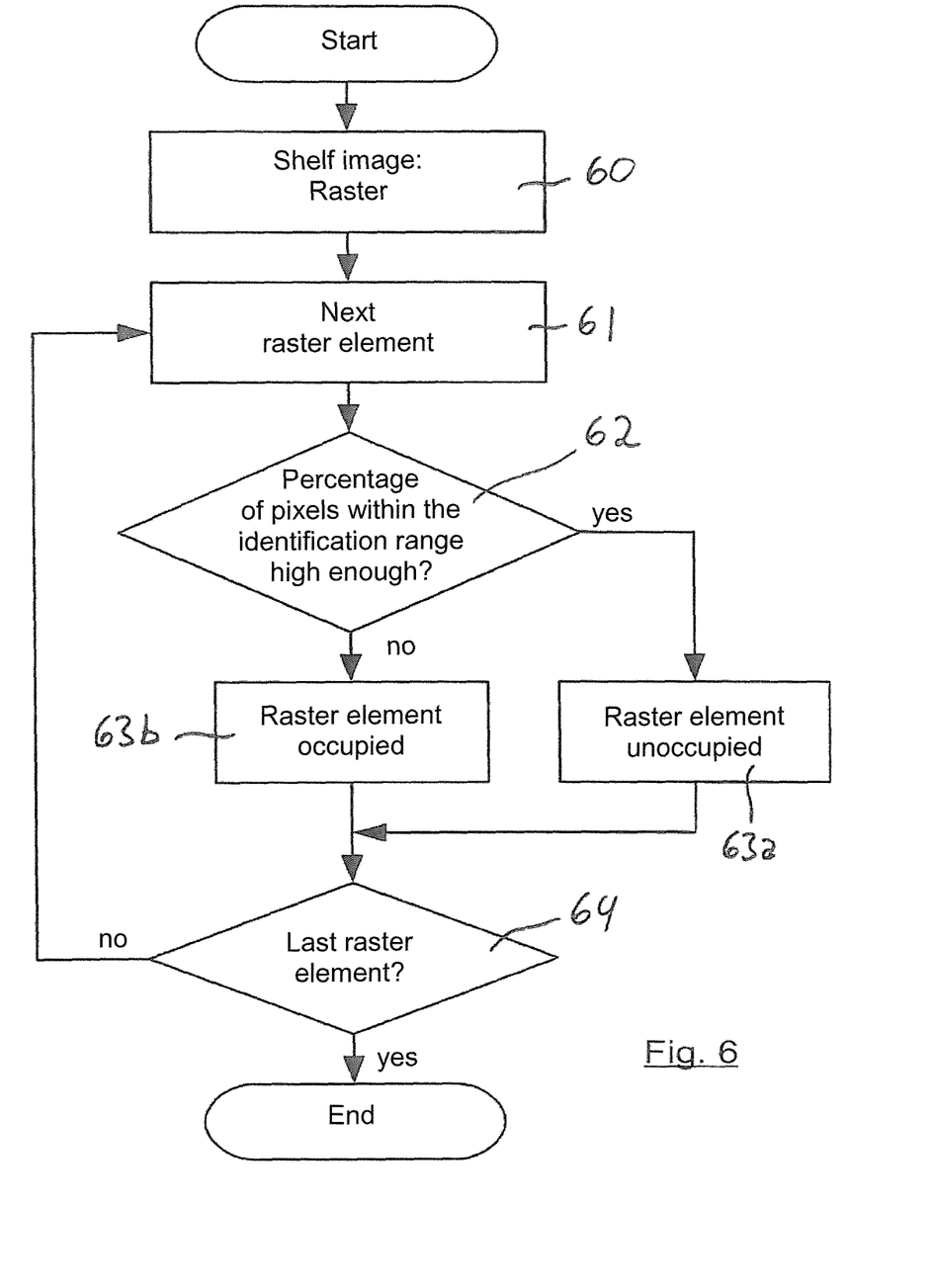
FIG. 6 a flow chart depicting a method for detecting free storage space.

In order to further improve detection of free storage space the image data processing unit 38 additionally performs the method shown in FIG. 6. For this purpose, the image data processing unit 38 first retrieves picture 39b, which was taken after the storage operation from the image data archive 34.

In a first step 60, the raster 38a is superimposed on the picture 39b. The image data processing unit 38 selects a raster element for verification in step 61. In step 62 the image data processing unit 38 detects the percentage of pixels of the raster element showing color values within an identification range.

The identification range is selected to ensure that the majority of the pixels in a raster element without storage goods are within the identification range. If, for example, the floor of the carriers 15 is of white color, the identification range can be from 80% brightness to 100% brightness evenly for all colors.

If, on the other hand, the floor of the carrier 15 is of black color, the range from 0% to 20% brightness is, for example, to be selected for the identification range. In case of a light green floor the identification range will, for example, be from 80%-100% for green and from 60%-90% for red and blue color respectively.

After determining the percentage of pixels within the identification range the image data processing unit 38 compares the percentage with a reference value which, in this case, shall be 80%. Thus, if the color values of at least 80% of the pixels of the raster element are within the identification range the raster element is marked as unoccupied in step 63a. If, however, less than 80% of the color values of the pixels of the raster element are within the identification range, the raster element is marked as occupied in the occupancy information memory 37 in step 63b.

In a simplified version of the method the color values of the pixels can be converted into gray values before the comparison. Saving in necessary processing power accomplished by this will however be at the expense of accuracy in detecting free storage space.

In step 64, the image data processing unit 38 verifies whether it has verified all raster elements. If this is not the case the method is continued with a new raster element in step 61. If, however, all raster elements have been processed the image data processing unit 38 will terminate detection of free storage space.

In order to allow a positive determination of which storage goods 17, 17a were stored or removed during a storage or removal operation, the RFID tags 27 of the storage goods 17 contained in the carrier 15 are scanned before the storage or removal operation. The result is compared with the result of another scan performed after the storage or removal operation. New additional RFID tags 27 indicate newly stored storage goods 17a while missing RFID tags 27 identify storage goods 17 which have been removed.

The described method is also available as a computer program product designed to be executed on the computer 20. In this case, the computer 20 is a control computer for the storage rack 10. It would also be conceivable to provide an industrial PC with an interface for the storage rack 10 and for its loading and removal device 13 respectively, as well as with an interface for LAN 21 and to execute an appropriate computer program product in such a computer 20.

Instead of the LAN 21 a CAN bus may be provided for communication of the units with each other.

In case of the lens coverage of the digital camera 24 being insufficient to view the carrier 15 in its entirety several digital cameras 24 may be provided and separate images thereof can be assembled by image data processing unit 38 into a complete image of the carrier 15.

The storage rack according to the present invention in association with the method according to the present invention provides a simple and reliable possibility to reduce operator errors and to accelerate the storage and removal operations in a storage rack 10.

LIST OF REFERENCE NUMBERS

10 Storage rack
11a Module
11b Module
12 Conveyor space
13 Loading and removal device
14 Carrier support
15 Carrier
17 Storage goods
17a Storage goods
18 Access opening
19 Top face
20 Computer
21 LAN
22 Operator device
23 Visual inspection station
24 Image capture device (digital camera)
26 RFID receiver (contactless sensing device)
27 RFID tag
30 Communication interface
31 Central processing unit
32 Storage interface
33 Data memory
34 Image data archive memory
35 Size data memory
36 Storage data base
37 Occupancy information memory
38 Image data processing unit
38a Raster
39a Image 1
39b Image 2
40-47 Method steps
50-55 Method steps
60-64 Method steps

The invention claimed is:

1. A storage rack comprising:
a plurality of carrier supports arranged on top of each other for supporting carriers which can be moved by means of an automatic loading and removal device,
at least one access opening for inserting and removing the carriers, and
a computer wherein information about stored storage goods is stored,
at least one image capture device for optical recording of a carrier in its entirety and for optical recording of storage goods placed in the carriers and able to produce digital image information thereof, wherein the digital image information can be stored in the computer and recalled by means of a display unit,
a selection device responsive to the digital image information for selecting a carrier and movement thereof to the access opening by means of the computer assigned to the display unit, wherein,
the computer comprises an image data archive for archiving the digital image data of the carriers before and after storage goods are placed in or removed from a carrier and an image data processing unit for the recognition of free storage spaces using a comparison of the digital image information before and after storage goods are placed in or removed from a carrier from the image data archive.

2. The storage rack according to claim 1, wherein the computer comprises a size data memory containing data representing the storage space requirements of storage goods in order to allow determination of a free storage space.

3. The storage rack according to claim 1, wherein the display unit is designed for displaying a preview of the determined free storage space.

4. The storage rack according to claim 1, wherein the storage rack comprises a LAN or a CAN bus to allow communication between units.

5. The storage rack according to claim 1, wherein the storage rack comprises a contactless sensing device allowing recognition of storage goods.

6. The storage rack according to claim 5, wherein the stored goods comprise a wireless transponder device to allow identification thereof, and in that a communication device for wireless transponders designed for transferring identification data to the computer is associated with the storage rack.

7. The storage rack according to claim 6, wherein the wireless transponder device comprises an RFID-tag.

8. The storage rack according to claim 6, wherein the communication comprises an RFD receiver.

9. A method for storing or removing storage goods in a storage rack according to claim 1, comprising the steps of:
(a) identifying storage goods to be stored by an operator or by means of a contactless sensing device;
(b) transferring the carrier including a detected free storage space to the access opening;
(c) storing storage goods;
(d) reconciling occupancy information;
(e) detecting of the free storage space by the computer using stored image data and
(f) displaying the storage space determined by the computer during a storage operation to an operator by means of the display unit wherein the operator may reject said storage space, in which case another free storage space will be determined.

10. A computer program product for performing the method according claim 9.

11. The method according to claim 9 wherein the image data processing unit splits the digital image data into a raster, the raster elements of which can be marked as free or occupied in the occupancy information memory.

12. The method according to claim 11, wherein the image capture device generates an image of the carrier before and after storage or removal respectively and will transfer it to the image data archive for reconciling the occupancy information memory.

13. The method according to claim 12, wherein the image data processing unit compares the raster elements of the image generated before storage or removal to those of the image generated after storage or removal in order to reconcile the occupancy information memory and in case of a change in a raster element will adjust an occupancy status associated with this raster element.

14. The method according to claim 13, wherein the image data processing unit calculates a difference for each pixel of a raster element between the pixel of the image generated before storage or removal and the pixel of the image generated following storage or removal and totals the pixels within a raster element in order to calculate a similarity value.

15. The method according to claim 11, wherein the image capture device performs a method comprising the following steps in order to detect free raster elements:
   (a) determining the percentage of pixels the color values of which are within an identification range;
   (b) marking the raster element as unoccupied if the percentage exceeds a defined threshold value.

16. The method according to claim 15, wherein the image capture device performs the method to detect free raster elements for each raster element of a carrier.

17. The method according to claim 9, wherein the computer comprises a storage data base wherein the storage locations or amounts of the storage goods are stored.

18. The method according to claim 17, wherein when the occupancy information memory is reconciled the computer will store the storage location and the identification of the storage goods determined based on the digital image information in the storage data base.

19. The method according to claim 17, wherein the computer generates a list of the storage goods contained in the carrier before and after the storage or removal operation respectively and will determine storage goods which have been removed or stored by comparison of the lists.

* * * * *